United States Patent [19]

Tagawa et al.

[11] 4,307,067
[45] Dec. 22, 1981

[54] PROCESS FOR DEODORIZING EXHAUST GAS CONTAINING SMELLY COMPONENTS

[75] Inventors: Taichi Tagawa, Takatsuki; Jinji Tani, Toyonaka; Shingo Tominaga, Uji; Shigeru Suzuki, Osaka; Shigeru Kikuchi, Sakai, all of Japan

[73] Assignee: Osaka Oxygen Industries Ltd., Osaka, Japan

[21] Appl. No.: 85,327

[22] Filed: Oct. 16, 1979

[30] Foreign Application Priority Data

Apr. 23, 1979 [JP] Japan ............................... 54/50159

[51] Int. Cl.³ ................... B01D 53/36; C01B 17/16; C01C 1/00
[52] U.S. Cl. ........................................ 423/224; 422/5; 422/168; 423/238; 423/245
[58] Field of Search ............... 422/4, 5, 168, 169, 422/105, 110, 111; 23/230 A; 423/224, 238, 245 R

[56] References Cited

U.S. PATENT DOCUMENTS 3,989,465 11/1976 Onnen ........................... 422/110

FOREIGN PATENT DOCUMENTS 2339526 2/1975 Fed. Rep. of Germany ... 423/245 R
52-30766 3/1977 Japan .......................... 423/245 R
54-125170 9/1979 Japan ............................. 423/238
54-125172 9/1979 Japan ............................. 423/245 R

*Primary Examiner*—Arnold Turk
*Attorney, Agent, or Firm*—Browdy and Neimark

[57] ABSTRACT

A process for deodorizing an exhaust gas containing at least one smelly material selected from the group consisting of acidic smelly materials, such as hydrogen sulfide, mecaptans, dimethyl sulfide, dimethyl disulfide and the like; basic smelly materials, such as ammonia, amines and the like; and smelly organic material, such as ketones, alcohols, aldehydes, carboxylic acids and the like is disclosed. Vapor-liquid contact of the exhaust gas with a sodium hypochlorite solution is caused in the presence of a catalyst which is a mixture of nickel peroxide and at least one carrier. In the presence of the catalyst, placed in a column, sodium hypochlorite solution falling from the upper portion of the column contacts exhaust gas rising from the lower portion of the column to promote catalyst oxidation reaction. The amount of sodium hypochlorite solution fed into the upper portion of column is adjusted so that the concentration of the sodium hypochlorite solution in the bottom of column is maintained at such a desired value that optimum oxidation reaction occurs, and sodium hydroxide solution is added to the sodium hypochlorite solution so that pH of the sodium hypochlorite solution in the bottom of the column is kept within the range of from 7.5 to 11.0.

13 Claims, 5 Drawing Figures

PROCESS FOR DEODORIZING EXHAUST GAS CONTAINING SMELLY COMPONENTS

BACKGROUND OF THE INVENTION

This invention relates to a process for deodorizing smelly exhaust gas containing at least one smelly material selected from the group consisting of acidic smelly materials, such as hydrogen sulfide, mercaptans, dimethyl sulfide, dimethyl disulfide and the like; basic smelly materials, such as ammonia, amines and the like; and smelly organic materials, such as ketones, alcohols, aldehydes, carboxylic acids and the like, which is generated from disposal of human excrements or sewage disposal.

Treatment of such exhaust gas is usually effected in the following steps:

(a) the first step for removing basic components in the gas;

(b) the second step for removing acidic components in the gas with a sodium hypochlorite solution; and (c) the third step for adsorbing the remaining smelly components in the gas with activated carbon.

The above first step includes (i) a method for washing the exhaust gas by water, (ii) a method for washing exhaust gas with a dilute solution of hydrochloric acid or sulfuric acid, or (iii) a method for washing the exhaust gas with a solution of sodium hypochlorite containing hydrochloric acid and sulfuric acid.

In the above method (i), a large amount of water is necessary for removing water-soluble, basic materials efficiently. Water containing ammoniacal nitrogen, $NH_4^+$—N, etc. causes secondary pollution. In the above method (ii), control of concentration of the acidic solution in response to the concentration of the basic components in the exhaust gas is necessary. In the above method (iii), there is possibility of generation of chlorine compounds, which tend to cause secondary pollution. When a solution of sodium hypochlorite with high concentration is used for treating such exhaust gas, excess sodium hypochlorite remains in the solution after contacting the gas. The sodium hypochlorite remaining in the waste solution causes secondary pollution, such as water pollution. In this case, a sodium hypochlorite mist is further entrained in the treated exhaust gas. Such exhaust gas containing sodium hypochlorite mist causes air pollution, since the sodium hypochlorite generates oxidant, such as atomic oxygen. When the exhaust gas containing the sodium hypochlorite mist is washed with water, it is necessary to further treat the washing water to make it harmless.

SUMMARY OF THE INVENTION

The present inventors have carried out many research projects for overcoming these shortcomings and for lowering running cost. So, we found that though exhaust gas generated from sewage disposal and disposal of human excrements contains a variety of materials, most of the materials in high concentration are usually hydrogen sulfide and ammonia. It is believed that reaction of each of $H_2S$ and $NH_3$ with sodium hypochlorite occurs in the following equations:

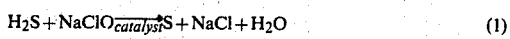

(1)

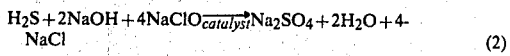

(2)

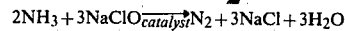

(3)

Equation (1) is preferable to equation (2), since the amount of NaClO consumed in equation (1) is less than that in equation (2). We found that when exhaust gas containing $H_2S$ and $NH_3$ contacts NaClO in the presence of nickel peroxide, the reactions in the above equations (1) and (3) occur simultaneously and preferentially. This invention is formed on the basis of this discovery.

An object of this invention is to provide a process for treating exhaust gas from sewage disposal or disposal of human excrements without requiring many steps.

This invention relates to a process for deodorizing an exhaust gas containing at least one smelly material selected from the group consisting of acidic smelly materials, such as hydrogen sulfide, mercaptans, dimethyl sulfide, dimethyl disulfide and the like; basic smelly materials, such as ammonia, amines and the like; and smelly organic materials, such as ketones, alcohols, aldehydes, carboxylic acids and the like which comprises causing vapor-liquid contact of the exhaust gas with a sodium hypochlorite solution in the presence of a catalyst, characterized in that the catalyst is a mixture of nickel peroxide and at least one carrier, and the catalyst is placed in a column, and in the presence of the catalyst the sodium hypochlorite solution falling from the upper portion of the column contacts the exhaust gas rising from the lower portion of the column to promote catalytic oxidation reaction, the amount of sodium hypochlorite solution fed into the upper portion of column is adjusted so that the concentration of the sodium hypochlorite solution in the bottom of column is maintained at such a desired value that optimum oxidation reaction occurs, and a sodium hydroxide solution is added to the sodium hypochlorite solution so that pH of the sodium hypochlorite solution in the bottom of the column is kept within the range of from 7.5 to 11.0.

DETAILED DESCRIPTION OF THE INVENTION

Figure 1:
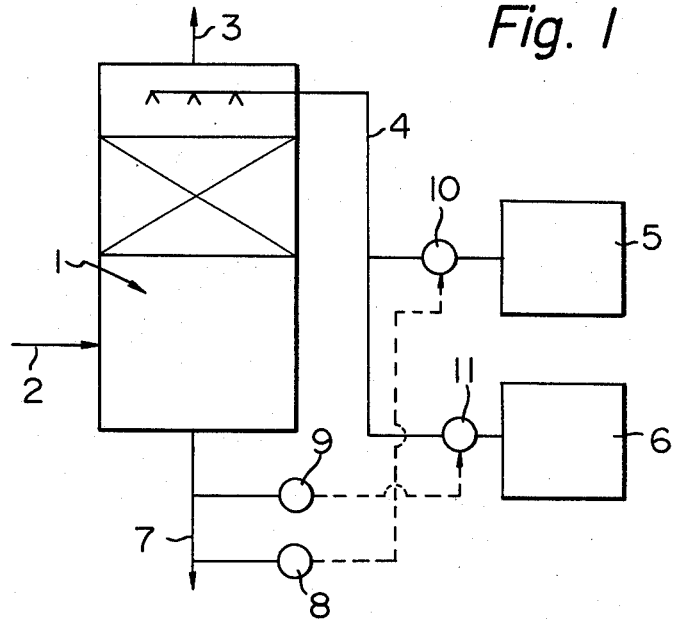
FIGS. 1–5 are flow sheets showing each of embodiments of this invention.

The oxidation catalyst promotes decomposition of sodium hypochlorite and oxidation of any components in the exhaust gas.

The catalyst is prepared by the following processes:

(1) The process comprises having a carrier selected from the group consisting of chemical resistant resin moldings, such as polyvinyl chloride resin, polyethylene resin, polypropylene resin, fluorine resin and the like and inorganic material moldings, such as synthetic zeolite, ceramic, alumina and the like, bear nickel peroxide with a chlorine and/or fluorine-containing resin solution as an adhesion medium; or having the carrier bear a mixture of nickel peroxide and the chlorine and/or fluorine resin solution.

(2) The process comprises having a carrier selected from the group consisting of chemical resistant resin moldings, such as polyvinyl chloride resin, polyethylene resin, polypropylene resin, fluorine resin and the like, and inorganic material moldings, such as synthetic zeolite, ceramic, alumina and the like, bear at least one nickel compound selected from the group consisting of nickel sulfate, nickel nitrate, nickel carbonate and nickel hydroxide with a chlorine and/or fluorine-containing resin solution as an adhesion medium, and then contacting the carrier with an alkali metal hydroxide and an oxidizing agent to convert the nickel compound to nickel peroxide, or having the non treated carrier bear a mixture of the nickel compound and the chlorine and-/or fluorine resin, and then contacting the carrier with an alkali metal hydroxide and an oxidizing agent to convert the nickel compound to nickel peroxide.

(3) The process comprises blending a chlorine and/or fluorine-containing resin and nickel peroxide, molding the blending and curing it.

(4) The process comprises blending a chlorine and/or fluorine-containing resin and at least one nickel compound selected from the group consisting of nickel sulfate, nickel nitrate, nickel carbonate and nickel hydroxide, and molding the blending and curing it, and then contacting the molding with an alkali metal hydroxide and an oxidizing agent to convert the nickel compound to nickel peroxide. In steps (3) and (4), at least one inorganic material powder selected from the group consisting of synthetic zeolite, ceramic, alumina and the like may be blended with the chlorine and/or fluorine-containing resin and nickel peroxide or the nickel compound. The oxidizing agents employed for oxidizing the nickel compound include hypohalogenous acids, peroxide salt compounds and peroxy-acids. Examples of the oxidizing agents include NaClO, NaBrO, $H_2O_2$, ozone, $KMnO_4$ and the like. Other oxidizing agents being capable of converting the nickel compound to nickel peroxide may also be used in the present invention.

The smell of materials contained in the exhaust gas from disposal of human excrements varies largely with time. It is generally difficult to change the amount of sodium hypochlorite fed in response to the amount of smelly materials in the exhaust gas. When a solution of sodium hypochlorite in high concentration is used in response to a large amount of smelly materials in the exhaust gas, a large amount of unreacted sodium hypochlorite is discharged from the bottom of the column as the content of smelly materials in the exhaust gas is lowered.

According to the present invention, the amount of sodium hypochlorite solution fed into the upper portion of column is adjusted so that the concentration of the sodium hypochlorite solution in the bottom of column is maintained at such a desired value that optimum oxidation reaction occurs.

The concentration of the sodium hypochlorite solution in the bottom of column depends on the kinds of exhaust gas. However, in general, the concentration of the sodium hypochlorite solution may be in the order of from tens to hundreds ppm.

Columns employed in the present invention include packed column, plate column and bubble column.

The exhaust gas generated from sewage disposal or disposal of human excrements contains at least one smelly material selected from the group consisting of acidic smelly materials, such as hydrogen sulfide, mercaptans, dimethyl sulfide, dimethyl disulfide and the like; basic smelly materials, such as ammonia, amines and the like; and smelly organic materials, such as ketones, alcohols, aldehydes, carboxylic acids and the like. The present invention is suitable for treating the exhaust gas containing at least hydrogen sulfide and ammonia.

Examples of the oxidizing columns include packed column, plate column and bubble column. When packed column is used, known fillers are used in the oxidizing column. For example, synthetic resins, ceramic and the like in a ring or saddle form may be used as the filler.

The first embodiment of this invention is explained with reference to FIG. 1. A packed oxidizing column is shown at 1. The line for feeding gas to be treated is shown at 2. The line for discharging the treated gas is shown at 3. The line for feeding solution of NaClO and solution of NaOH for adjusting the pH of the solution of NaClO is shown at 4. A tank for the solution of NaClO is shown at 5, and a tank for the solution of NaOH is shown at 6. Line for discharging the waste solution of NaClO is shown at 7. A sensor for checking concentration of NaClO is shown at 8, and a pH sensor is shown at 9. The pump which works in response to signal from the concentration sensor is shown at 10, and the pump working in response to signal from the pH sensor is shown at 11. A catalyst is charged into oxidizing column 1. The exhaust gas is introduced into the column through line 2. A solution of NaClO is introduced into the column through 4. The exhaust gas contacts the solution of NaClO in the bed of nickel peroxide-adhered carrier or nickel peroxide-containing carrier, whereby the exhaust gas is deodorized. The concentration and the pH of NaClO solution discharged from the column through line 7 are measured by concentration sensor 8 and pH sensor 9. The workings of pumps 10 and 11 are controlled by signal from sensors 8 and 9, whereby the amounts of NaClO solution and NaOH solution to be fed into the column are adjusted.

Figure 2:
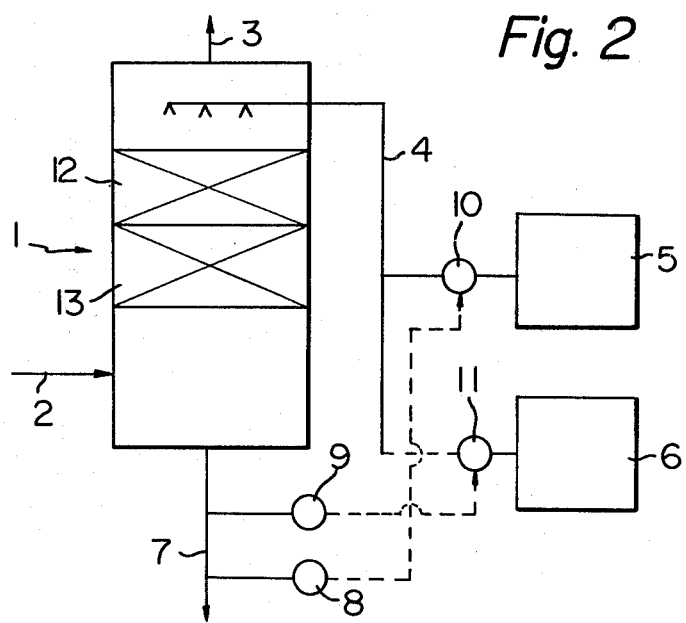

The second embodiment of this invention is explained with reference to FIG. 2. In the second embodiment, bed 12 of a filler not containing nickel peroxide is placed over the bed 13 of carrier containing nickel peroxide. In this second embodiment, the efficiency of deodorization of the exhaust gas is higher than that in the first embodiment. The filler not containing nickel peroxide means any materials not having catalytic action. The fillers employed in the present invention may be composed of inorganic material or synthetic resin. It is preferable that the filler be in a ring or a saddle form to increase its surface area.

Figure 3:
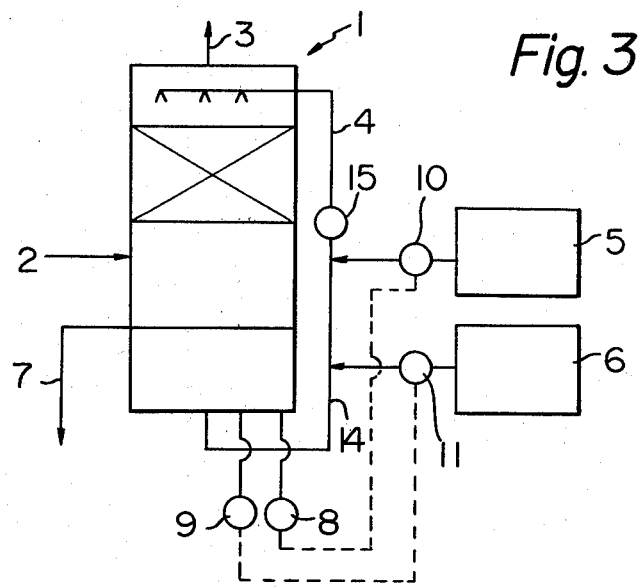

The third embodiment of this invention is explained with reference to FIG. 3. In this embodiment, the solution of NaClO which passed through the bed of catalyst is circulated by line 14 and pump 15. A fresh solution of NaClO and a solution of NaOH are added to the circulating NaClO solution. A portion of the solution of NaClO is discharged from the system through overflow 7. In this embodiment, NaClO is saved.

Figure 4:
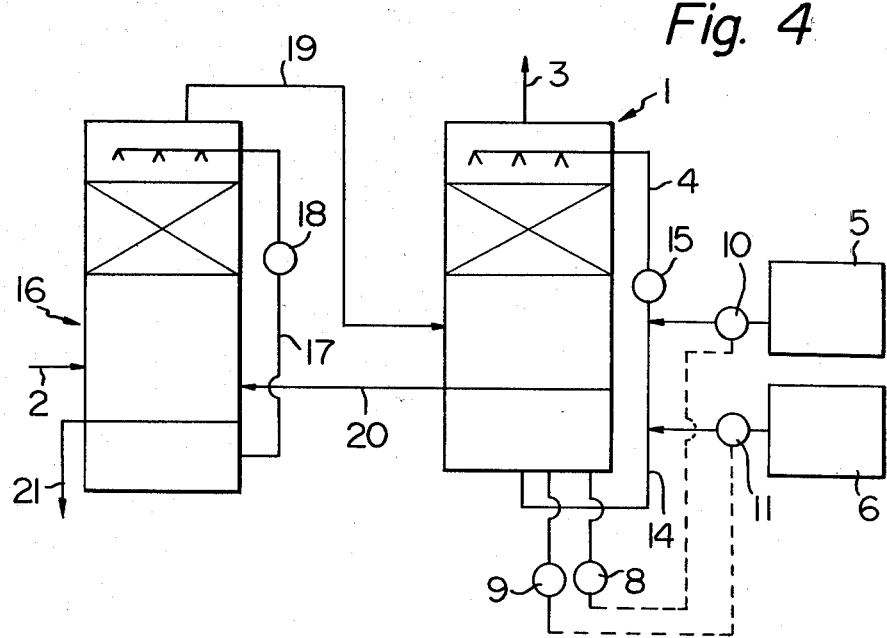

The fourth embodiment of this invention is explained with reference to FIG. 4. In this embodiment, the exhaust gas to be treated is washed in washing column 16, before it is introduced into oxidizing column 1. The waste NaClO solution is used as a washing solution employed in column 16. The carrier charged into the washing column may be the catalyst employed in the present invention or other carriers. The NaClO solution discharged from oxidizing column 1 is fed into the bottom of washing column 16. The solution is circulated to the upper portion of column 16 through line 17 and pump 18. The previously washed exhaust gas is fed into oxidizing column 1 through line 19. The waste NaClO solution is discharged from the system through line 20 by overflow. In this embodiment, NaClO is effectively used.

Figure 5:
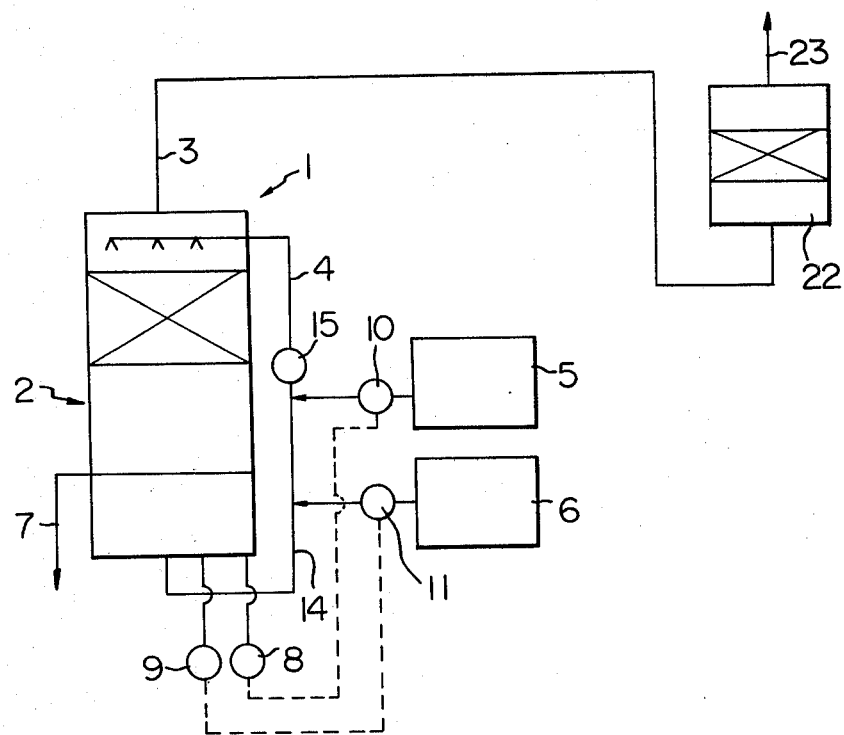

The fifth embodiment is explained with reference to FIG. 5. In this embodiment, the treated exhaust gas discharged from oxidizing column 1 is passed for post-treatment through a column into which activated carbon, zeolite or mixture thereof is charged, thereby removing oxidizing materials, such as NaClO mist and/or ozone contained the gas.

The invention is further illustrated, but in no way limited by the following Examples. The percent and parts are by weight, unless otherwise specified.

EXAMPLE 1

Preparation of catalyst

Commercially available nickel sulfate ($NiSO_4 \cdot 6H_2O$) was used. One thousand ml of a 20% aqueous solution of the nickel sulfate was prepared. To the solution of nickel sulfate were added 600 ml of a 10% aqueous solution of NaOH and 500 ml of a 5% aqueous solution of NaClO to form nickel peroxide. The resulting mixture was filtered to separate a precipitate from the mixture. Then the precipitate was dried to obtain nickel peroxide powder. 20% of the nickel peroxide powder, 40% of commercially available synthetic zeolite and 40% of solution containing 30% polyvinyl chloride resin and 70% methyl ethyl ketone were blended. The blending was molded and dried at room temperature for 24 hours.

EXAMPLE 2

Preparation of catalyst

Rigid polyvinyl chloride pipes having outer diameter of 15 mm, inner diameter of 10 mm and length of 15 mm were used as a carrier. The carrier was immersed in a solution containing 30% polyvinyl chloride resin and 70% methyl ethyl ketone, $NiSO_4 \cdot H_2O$ or $NiSO_4$ powder obtained by dehydrating commercially available $NiSO_4 \cdot 6H_2O$ was adhered on the carrier thus treated. Thereafter, the nickel sulfate-adhered carrier was dried at room temperature for 24 hours. The dried carrier was immersed in an aqueous solution containing NaOH and NaClO for 4 hours to convert the nickel sulfate on the carrier to nickel peroxide. Then the carrier was washed with water.

EXAMPLE 3

Commercially available ceramic ball was used as a carrier. The ball was immersed into a solution containing 30% fluorine resin powder and 70% hydrogenerated petrolium naphtha. $NiSO_4 \cdot H_2O$ or $NiSO_4$ powder obtained by dehydrating commercially available nickel sulfate ($NiSO_4 \cdot 6H_2O$) was adhered on the carrier. The nickel sulfate-adhered carrier was heated at 250° C. for 10 minutes. The carrier thus treated was immersed into an aqueous solution containing NaOH and NaClO to convert the nickel sulfate on the carrier to nickel peroxide. Thereafter, the carrier was washed with water.

EXAMPLE 4

In this example, the relationship between the pH of aqueous solution of NaClO and the amount of Ni released from the nickel peroxide bed into the waste solution was measured. The results are shown in Table 1.

TABLE 1

| pH of aqueous solution of NaClO | Amount of Ni released from the nickel peroxide bed into (mg/liter) the waste solution |
|---|---|
| 7 | 10 |
| 7.5 | 2 |
| 8 | 0.3 |
| 8.5 | 0.1 |
| 9 | 0.05 |
| 9.5 | 0.05 |
| 10 | 0.05 |

Test Conditions

Flow rate of exhaust gas: 0.3 $Nm^3$/minute
Flow rate of waste solution: 0.1 l/minute
Material charged into column: 2 liter of catalyst prepared in Example 1.
Column: packed column
Exhaust gas: air containing 50 ppm of $H_2S$ In the present invention, an aqueous solution of NaOH in a controlled amount is added to the aqueous solution of NaClO in order to adjust the pH of the aqueous solution of NaClO. The pH of the aqueous solution of NaClO is in the range of from 7.5 to 11.0, preferably from 8.5 to 9.5.

EXAMPLE 5

The case in which the adjustment of pH of the aqueous solution of NaClO was effected was compared with the case in which such adjustment was not effected. The result are shown in Table 2.

TABLE 2

| | Activity of catalyst (amount of NaClO decomposed per unit of catalyst) | |
|---|---|---|
| Operating time (hr.) | Case in which no adjustment of pH of NaClO solution is effected | Case in which adjustment of pH of NaClO solution is effected |
| 0 | 50 | 50 |
| 1000 | 30 | 45 |
| 2000 | 10 | 45 |

Test Conditions

Flow rate of exhaust gas: 0.3 $Nm^3$/minute
Composition of exhaust gas: air containing 50 ppm of $H_2S$
NaClO concentration in the bottom of column: 30 to 100 ppm
PH of the NaClO solution in the bottom of column: 8.5 to 9.0
Type of oxidizing column: packed column
Materials charged into column: 4 liters of catalyst prepared in Example 1

EXAMPLE 6

In this example, the exhaust gas was deodorized by placing a bed of a filler composed of net rings made of polyethylene resin containing no nickel peroxide over the bed of the catalyst containing nickel peroxide. The results are shown in Table 3.

TABLE 3

| Concentration of $H_2S$ in exhaust gas at inlet of column (ppm) | Odor Concentration in exhaust gas at inlet of column | Run 1 (Only catalyst) | | Run 2 (Catalyst + filler) | |
|---|---|---|---|---|---|
| | | $H_2S$ concentration in the gas at outlet of column (ppm) | Odor concentration in the gas at outlet of column | $H_2S$ concentration in the gas at outlet of column (ppm) | Odor concentration in the gas at outlet of column |
| 2 | 5,500 | 0.05 | 300 | 0.02 | 100 |
| 20 | 55,000 | 0.1 | 550 | 0.03 | 174 |
| 50 | 130,000 | 0.15 | 980 | 0.04 | 300 |

Test Conditions
  Flow rate of exhaust gas: same as in Example 5
  Type of oxidizing column: same as in Example 5
  Exhaust gas: air containing 2.20 or 50 ppm of $H_2S$
  Materials charged into column:
    Run 1: 4 liters of catalyst prepared in Example 1
    Run 2: lower portion of column: 2 liters of catalyst
      upper portion of column: 2 liters of filler
  $H_2S$ concentration was measured by FPD-GC (Flame Photometric Detector of Gas Chromatography). Odor concentration was measured by a triangle odor bag method.

As is apparent in the above data, the use of filler bed in addition to catalyst bed increases the effectivity of deodorization.

EXAMPLE 7

A previous washing column was used in addition to the oxidizing column in this example. The filler as employed in Example 6 was employed in the washing column. The catalyst and the filler were packed in the oxidizing column in the same way as in Example 6. The waste solution discharged from the oxidizing column was used as a washing solution in the washing column. The results are shown in Table 4.

TABLE 4

| Concentration of smelly component namely $H_2S$ in the exhaust gas (ppm) | Ratio of amount of NaClO solution consumed | |
|---|---|---|
| | use of only oxidizing column | use of oxidizing column and of washing column |
| 50 | 100 | 80 |

Test Conditions
Flow rate of exhaust gas  
Exhaust gas  
NaClO concentration in the bottom of column  
PH of the NaClO solution in the bottom of column  
Type of oxidizing column  
} same as in Example 5

Materials charged into column
  oxidizing column - lower portion of column: 2 liters of catalyst prepared in Example 1
  upper portion of column: 2 liters of filler employed in Example 6
  washing column: 4 liters of carrier employed in Example 1

When a washing column is used in addition to an oxidizing column, it is apparent from Table 4 that NaClO solution can be saved.

EXAMPLE 8

Test for deodorizing exhaust gas generated from sewage disposal

The exhaust gas generated from disposal of human excrements contains much smelly material. When such exhaust gas containing much smelly material is treated with a NaClO solution, a NaClO solution with a high concentration must be used. So, the exhaust gas treated with the NaClO solution in a high concentration contains a NaClO mist, a chlorine gas and ozone and has odor concentration of as high as 300 to 1000.

In this example, the exhaust gas having such high odor concentration, which was discharged from an oxidizing column was post-treated with activated carbon-zeolite. The results are shown in Table 5.

TABLE 5

| Operating time (hr) | Odor concentration in exhaust gas | | |
|---|---|---|---|
| | at inlet of oxidizing column | at outlet of oxidizing column | at outlet of post-treating column |
| 0 | 17,000 | 730 | <30 |
| 100 | 130,000 | 410 | <30 |
| 1,000 | 31,000 | 550 | <30 |

Test Conditions
  Exhaust gas: air containing 5 to 50 ppm of $H_2S$
  Post treating column: 2 liters of activated carbon-zeolite
  Other conditions were the same as those of Example 7.

EXAMPLE 9

Test Conditions
  Flow rate of exhaust gas: 10 Nm$^3$/min.
  Concentration of NaClO solution in the bottom of column: 30 to 100 ppm
  PH of the NaClO solution in the bottom of column: 8.5 to 9.0
  Type of oxidizing column: packed column
  Materials charged into the column lower portion of column: 40 liters of catalyst prepared in Example 1
  upper portion of column: 40 liters of plastic mold
  Test results are shown in Table 6.

TABLE 6

| Smelly materials in exhaust gas | at inlet of column (ppm) | at outlet of column (ppm) |
|---|---|---|
| hydrogen sulfide | 0.9 | 0.003 |
| ammonia | 0.19 | 0.04 |
| methyl mercaptan | 0.012 | <0.001 |
| dimethyl sulfide | 0.009 | 0.001 |
| dimethyl disulfide | <0.001 | <0.001 |
| trimethyl amine | <0.0001 | <0.0001 |
| acetic acid | 0.0028 | 0.0013 |
| odor concentration | 3000 | 10 |

EXAMPLE 10

Test for deodorizing exhaust gas generated from disposal of human excrements

Test Conditions
 Flow rate of exhaust gas: 10 Nm$^3$/min.
 Concentration of NaClO solution in the bottom of column: 300–400 ppm
 PH of NaClO solution in the bottom of column: 8.5–9.5
 Type of oxidizing column: packed column
 Materials charged into column
  oxidizing column—lower portion: 60 liters of catalyst prepared in Example 1
  oxidizing column—upper portion: 40 liters of net ring employed in Example 6
  washing column: 100 liters of net ring employed in Example 6
  post-treating column: 120 liters of activated carbon-zeolite The results are shown in Table 7.

TABLE 7

| | | Exhaust gas before treatment | at inlet of oxidizing column | at outlet of oxidizing column | at outlet of post-treating column |
|---|---|---|---|---|---|
| Smelly | hydrogen sulfide | 29 | 14 | 0.01 | 0.01 |
| components | ammonia | 3 | 0.14 | <0.05 | <0.05 |
| in exhaust | methyl mercaptan | 5.2 | 5.2 | 0.0004 | 0.0004 |
| gas | dimethyl sulfide | 3.5 | 3.1 | <0.0003 | <0.0003 |
| | dimethyl disulfide | 0.04 | 0.026 | <0.002 | <0.002 |
| | trimethyl amine | 0.015 | 0.0078 | 0.0004 | 0.0002 |
| | acetaldehyde | <0.002 | — | — | <0.002 |
| Odor concentration | | 31000 | 9800 | 310 | 20 |

We claim:

1. A process for deodorizing an exhaust gas containing at least one smelly material selected from the group consisting of acidic smelly materials, basic smelly materials, and smelly organic materials, and including at least hydrogen sulfide and ammonia, comprising:
 causing vapor-liquid contact of the exhaust gas with a sodium hypochlorite solution in the presence of a catalyst, said catalyst being a mixture of nickel peroxide and at least one carrier,
 wherein said causing step comprises contacting, in a column having an upper portion and a lower portion with said catalyst placed therein, sodium hypochlorite solution falling from the upper portion of the column with exhaust gas rising from the lower portion of the column to promote catalytic oxidation reaction, the amount of sodium hypochlorite solution fed into the upper portion of the column being adjusted so that the concentration of the sodium hypochlorite solution in the bottom of column is maintained at such value that optimum oxidation reaction occurs, and
 wherein a sodium hydroxide solution is added to the sodium hypochlorite solution so that the pH of the sodium hypochlorite solution in the bottom of the column is kept with the range of from 7.5 to 11.0.

2. The process as defined in claim 1 wherein the sodium hydroxide solution is added to the sodium hypochlorite solution so that pH of the sodium hypochlorite solution in the bottom of the column is kept within the range of from 8.5 to 9.5.

3. The process as defined in claim 1 wherein a bed of filler not containing nickel peroxide is further charged over the bed of catalyst in said column.

4. The process as defined in claim 1 wherein the solution of sodium hypochlorite is circulated from the bottom of said column to the top of said column, and a fresh solution of sodium hypochlorite and a solution of sodium hydroxide are added to the circulating solution of sodium hypochlorite.

5. The process as defined in claim 1 wherein before the exhaust gas is introduced into the oxidizing column, the gas is washed in a washing column with the solution of sodium hypochlorite discharged from the oxidizing column.

6. The process as defined in claim 1 wherein the exhaust gas discharged from the oxidizing column contacts activated carbon, zeolite or a mixture of activated carbon and zeolite to remove oxidizing materials from the gas.

7. The process as defined in claim 1 wherein the catalyst is prepared by blending a chlorine and/or fluorine-containing resin and nickel peroxide, molding the blending and curing it.

8. The process as defined in claim 7 wherein at least one inorganic material powder selected from the group consisting of synthetic zeolite, ceramic, and alumina is further blended with the chlorine and/or fluorine-containing resin and nickel peroxide.

9. The process as defined in claim 1 wherein the catalyst is prepared by blending a chlorine and/or fluorine-containing resin and at least one nickel compound selected from the group consisting of nickel sulfate, nickel nitrate, nickel carbonate and nickel hydroxide, and molding the blending and curing it, and then contacting the molding with an alkali metal hydroxide and an oxidizing agent to convert the nickel compound to nickel peroxide.

10. The process as defined in claim 9 wherein at least one inorganic material powder selected from the group consisting of synthetic zeolite, ceramic, and alumina is further blended with the chlorine and/or fluorine-containing resin and the nickel compound.

11. The process as defined in claim 1 wherein the catalyst is prepared by having a carrier selected from the group consisting of chemical-resistant resin moldings and inorganic material moldings, bear nickel peroxide with the use of a chlorine and/or fluorine-containing resin solution as an adhesion medium; or having said carrier bear a mixture of nickel peroxide and the chlorine and/or fluorine resin solution.

12. The process as defined in claim 1 wherein the catalyst is prepared by having a non-treated carrier selected from the group consisting of chemical-resistant resin moldings and inorganic material moldings, bear at least one nickel compound selected from the group consisting of nickel sulfate, nickel nitrate, nickel carbonate and nickel hydroxide with the use of a chlorine and/or fluorine-containing resin solution as an adhesion medium, and then contacting the carrier with an alkali metal hydroxide and an oxidizing agent to convert the nickel compound to nickel peroxide; or having the non-treated carrier bear a mixture of said nickel compound and said chlorine and/or fluorine resin, and then contacting the carrier with an alkali metal hydroxide and an oxidizing agent to convert the nickel compound to nickel peroxide.

13. The process as defined in any one of claims 11 and 12, wherein said carrier molding is of a material selected from the group consisting of polyvinyl chloride resin, polyethylene resin, polypropylene resin, fluorine resin, synthetic zeolite, ceramic and alumina.

* * * * *